(12) United States Patent
Harvey et al.

(10) Patent No.: US 11,966,513 B2
(45) Date of Patent: Apr. 23, 2024

(54) HAPTIC OUTPUT SYSTEMS

(71) Applicant: Cirrus Logic International Semiconductor Ltd., Edinburgh (GB)

(72) Inventors: Thomas Ivan Harvey, Northcote (AU); Anthony Stephen Doy, Bend, OR (US); Anthony John Shilton, Northcote (AU)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 17/581,437

(22) Filed: Jan. 21, 2022

(65) Prior Publication Data
US 2022/0197389 A1 Jun. 23, 2022

Related U.S. Application Data

(63) Continuation of application No. 16/103,018, filed on Aug. 14, 2018, now Pat. No. 11,269,415.

(51) Int. Cl.
| | |
|---|---|
| *G06F 3/01* | (2006.01) |
| *G06F 3/041* | (2006.01) |
| *H02N 2/02* | (2006.01) |
| *H02N 2/06* | (2006.01) |

(52) U.S. Cl.
CPC .......... *G06F 3/016* (2013.01); *G06F 3/0412* (2013.01); *H02N 2/026* (2013.01); *H02N 2/06* (2013.01)

(58) Field of Classification Search
CPC ...... G06F 3/016; G06F 3/0412; G06F 3/0416; G06F 3/0488; G06F 3/167; H02N 2/06; H02N 2/026

USPC ....................... 715/702; 340/407.1
See application file for complete search history.

(56) References Cited

U.S. PATENT DOCUMENTS

| | | | |
|---|---|---|---|
| 3,686,927 | A | 8/1972 | Scharton |
| 4,902,136 | A | 2/1990 | Mueller et al. |
| 5,374,896 | A | 12/1994 | Sato et al. |
| 5,684,722 | A | 11/1997 | Thorner et al. |
| 5,748,578 | A | 5/1998 | Schell |
| 5,857,986 | A | 1/1999 | Moriyasu |
| 6,050,393 | A | 4/2000 | Murai et al. |
| 6,278,790 | B1 | 8/2001 | Davis et al. |
| 6,294,891 | B1 | 9/2001 | McConnell et al. |
| 6,332,029 | B1 | 12/2001 | Azima et al. |
| 6,388,520 | B2 | 5/2002 | Wada et al. |
| 6,567,478 | B2 | 5/2003 | Oishi et al. |
| 6,580,796 | B1 | 6/2003 | Kuroki |
| 6,683,437 | B2 | 1/2004 | Tierling |

(Continued)

FOREIGN PATENT DOCUMENTS

| | | |
|---|---|---|
| AU | 2002347829 | 4/2003 |
| CN | 103165328 A | 6/2013 |

(Continued)

OTHER PUBLICATIONS

International Search Report and Written Opinion of the International Searching Authority, International Application No. PCT/GB2020/052537, dated Mar. 9, 2021.

(Continued)

*Primary Examiner* — Hwei-Min Lu
(74) *Attorney, Agent, or Firm* — Jackson Walker L.L.P.

(57) ABSTRACT

The application describes systems for deriving haptic and audio drive signals from an input signal received via a single channel such as an audio channel.

11 Claims, 3 Drawing Sheets

(56) References Cited

U.S. PATENT DOCUMENTS

| | | |
|---|---|---|
| 6,703,550 B2 | 3/2004 | Chu |
| 6,762,745 B1 | 7/2004 | Braun et al. |
| 6,768,779 B1 | 7/2004 | Nielsen |
| 6,784,740 B1 | 8/2004 | Tabatabaei |
| 6,816,833 B1 | 11/2004 | Iwamoto et al. |
| 6,906,697 B2 | 6/2005 | Rosenberg |
| 6,995,747 B2 | 2/2006 | Casebolt et al. |
| 7,042,286 B2 | 5/2006 | Meade et al. |
| 7,154,470 B2 | 12/2006 | Tierling |
| 7,277,678 B2 | 10/2007 | Rozenblit et al. |
| 7,301,094 B1 * | 11/2007 | Noro ............ B06B 1/0215 84/645 |
| 7,333,604 B2 | 2/2008 | Zernovizky et al. |
| 7,392,066 B2 | 6/2008 | Haparnas |
| 7,456,688 B2 | 11/2008 | Okazaki et al. |
| 7,623,114 B2 | 11/2009 | Rank |
| 7,639,232 B2 | 12/2009 | Grant et al. |
| 7,777,566 B1 | 8/2010 | Drogi et al. |
| 7,791,588 B2 | 9/2010 | Tierling et al. |
| 7,825,838 B1 | 11/2010 | Srinivas et al. |
| 7,979,146 B2 | 7/2011 | Ullrich et al. |
| 8,068,025 B2 | 11/2011 | Devenyi et al. |
| 8,098,234 B2 | 1/2012 | Lacroix et al. |
| 8,102,364 B2 | 1/2012 | Tierling |
| 8,325,144 B1 | 12/2012 | Tierling et al. |
| 8,427,286 B2 | 4/2013 | Grant et al. |
| 8,441,444 B2 | 5/2013 | Moore et al. |
| 8,466,778 B2 | 6/2013 | Hwang et al. |
| 8,480,240 B2 | 7/2013 | Kashiyama |
| 8,572,293 B2 | 10/2013 | Cruz-Hernandez et al. |
| 8,572,296 B2 | 10/2013 | Shasha et al. |
| 8,593,269 B2 | 11/2013 | Grant et al. |
| 8,648,659 B2 | 2/2014 | Oh et al. |
| 8,648,829 B2 | 2/2014 | Shahoian et al. |
| 8,659,208 B1 | 2/2014 | Rose et al. |
| 8,754,757 B1 | 6/2014 | Ullrich et al. |
| 8,754,758 B1 | 6/2014 | Ullrich et al. |
| 8,947,216 B2 | 2/2015 | Da Costa et al. |
| 8,981,915 B2 | 3/2015 | Birnbaum et al. |
| 8,994,518 B2 | 3/2015 | Gregorio et al. |
| 9,019,087 B2 | 4/2015 | Bakircioglu et al. |
| 9,030,428 B2 | 5/2015 | Fleming |
| 9,063,570 B2 | 6/2015 | Weddle et al. |
| 9,070,856 B1 | 6/2015 | Rose et al. |
| 9,083,821 B2 | 7/2015 | Hughes |
| 9,092,059 B2 | 7/2015 | Bhatia |
| 9,117,347 B2 | 8/2015 | Matthews |
| 9,128,523 B2 | 9/2015 | Buuck et al. |
| 9,164,587 B2 | 10/2015 | Da Costa et al. |
| 9,196,135 B2 | 11/2015 | Shah et al. |
| 9,248,840 B2 | 2/2016 | Truong |
| 9,326,066 B2 | 4/2016 | Kilppel |
| 9,329,721 B1 | 5/2016 | Buuck et al. |
| 9,354,704 B2 | 5/2016 | Lacroix et al. |
| 9,368,005 B2 | 6/2016 | Cruz-Hernandez et al. |
| 9,489,047 B2 | 11/2016 | Jiang et al. |
| 9,495,013 B2 | 11/2016 | Underkoffler et al. |
| 9,507,423 B2 | 11/2016 | Gandhi et al. |
| 9,513,709 B2 | 12/2016 | Gregorio et al. |
| 9,520,036 B1 | 12/2016 | Buuck |
| 9,588,586 B2 | 3/2017 | Rihn |
| 9,640,047 B2 | 5/2017 | Choi et al. |
| 9,652,041 B2 | 5/2017 | Jiang et al. |
| 9,696,859 B1 | 7/2017 | Heller et al. |
| 9,697,450 B1 | 7/2017 | Lee |
| 9,715,300 B2 | 7/2017 | Sinclair et al. |
| 9,740,381 B1 | 8/2017 | Chaudhri et al. |
| 9,842,476 B2 | 12/2017 | Rihn et al. |
| 9,864,567 B2 | 1/2018 | Seo |
| 9,881,467 B2 | 1/2018 | Levesque |
| 9,886,829 B2 | 2/2018 | Levesque |
| 9,946,348 B2 | 4/2018 | Ullrich et al. |
| 9,947,186 B2 | 4/2018 | Macours |
| 9,959,744 B2 | 5/2018 | Koskan et al. |
| 9,965,092 B2 | 5/2018 | Smith |
| 10,032,550 B1 | 7/2018 | Zhang et al. |
| 10,039,080 B2 | 7/2018 | Miller et al. |
| 10,055,950 B2 | 8/2018 | Saboune et al. |
| 10,074,246 B2 | 9/2018 | Da Costa et al. |
| 10,082,873 B2 | 9/2018 | Zhang |
| 10,102,722 B2 | 10/2018 | Levesque et al. |
| 10,110,152 B1 | 10/2018 | Hajati |
| 10,165,358 B2 | 12/2018 | Koudar et al. |
| 10,171,008 B2 | 1/2019 | Nishitani et al. |
| 10,175,763 B2 | 1/2019 | Shah |
| 10,191,579 B2 | 1/2019 | Forlines et al. |
| 10,264,348 B1 | 4/2019 | Harris et al. |
| 10,275,087 B1 | 4/2019 | Smith |
| 10,402,031 B2 | 9/2019 | Vandermeijden et al. |
| 10,564,727 B2 | 2/2020 | Billington et al. |
| 10,620,704 B2 | 4/2020 | Rand et al. |
| 10,667,051 B2 | 5/2020 | Stahl |
| 10,726,683 B1 | 7/2020 | Mondello et al. |
| 10,735,956 B2 | 8/2020 | Bae et al. |
| 10,782,785 B2 | 9/2020 | Hu et al. |
| 10,795,443 B2 | 10/2020 | Hu et al. |
| 10,820,100 B2 | 10/2020 | Stahl et al. |
| 10,828,672 B2 | 11/2020 | Stahl et al. |
| 10,832,537 B2 | 11/2020 | Doy et al. |
| 10,841,696 B2 | 11/2020 | Mamou-Mani |
| 10,848,886 B2 | 11/2020 | Rand |
| 10,860,202 B2 | 12/2020 | Sepehr et al. |
| 10,955,955 B2 | 3/2021 | Peso Parada et al. |
| 10,969,871 B2 | 4/2021 | Rand et al. |
| 10,976,825 B2 | 4/2021 | Das et al. |
| 11,069,206 B2 | 7/2021 | Rao et al. |
| 11,079,874 B2 | 8/2021 | Lapointe et al. |
| 11,139,767 B2 | 10/2021 | Janko et al. |
| 11,150,733 B2 | 10/2021 | Das et al. |
| 11,259,121 B2 | 2/2022 | Lindemann et al. |
| 11,460,526 B1 | 10/2022 | Foo et al. |
| 11,500,469 B2 | 11/2022 | Rao et al. |
| 11,669,165 B2 | 6/2023 | Das et al. |
| 2001/0043714 A1 | 11/2001 | Asada et al. |
| 2002/0018578 A1 | 2/2002 | Burton |
| 2002/0085647 A1 | 7/2002 | Oishi et al. |
| 2003/0068053 A1 | 4/2003 | Chu |
| 2003/0214485 A1 | 11/2003 | Roberts |
| 2004/0120540 A1 * | 6/2004 | Mullenborn ......... H04R 25/604 381/322 |
| 2005/0031140 A1 | 2/2005 | Browning |
| 2005/0134562 A1 | 6/2005 | Grant et al. |
| 2005/0195919 A1 | 9/2005 | Cova |
| 2006/0028095 A1 | 2/2006 | Maruyama et al. |
| 2006/0197753 A1 | 9/2006 | Hotelling |
| 2007/0013337 A1 | 1/2007 | Liu et al. |
| 2007/0024254 A1 | 2/2007 | Radecker et al. |
| 2007/0241816 A1 | 10/2007 | Okazaki et al. |
| 2008/0077367 A1 | 3/2008 | Odajima |
| 2008/0226109 A1 | 9/2008 | Yamakata et al. |
| 2008/0240458 A1 | 10/2008 | Goldstein et al. |
| 2008/0293453 A1 | 11/2008 | Atlas et al. |
| 2008/0316181 A1 | 12/2008 | Nurmi |
| 2009/0020343 A1 | 1/2009 | Rothkopf et al. |
| 2009/0079690 A1 | 3/2009 | Watson et al. |
| 2009/0088220 A1 | 4/2009 | Persson |
| 2009/0096632 A1 * | 4/2009 | Ullrich ............... H04N 21/81 340/407.1 |
| 2009/0102805 A1 | 4/2009 | Meijer et al. |
| 2009/0128306 A1 * | 5/2009 | Luden ........... H04N 21/43074 340/407.1 |
| 2009/0153499 A1 | 6/2009 | Kim et al. |
| 2009/0189867 A1 | 7/2009 | Krah |
| 2009/0278819 A1 | 11/2009 | Goldenberg et al. |
| 2009/0313542 A1 | 12/2009 | Cruz-Hernandez et al. |
| 2010/0013761 A1 | 1/2010 | Birnbaum et al. |
| 2010/0080331 A1 | 4/2010 | Garudadri et al. |
| 2010/0085317 A1 | 4/2010 | Park et al. |
| 2010/0141408 A1 | 6/2010 | Doy et al. |
| 2010/0141606 A1 | 6/2010 | Bae et al. |
| 2010/0260371 A1 | 10/2010 | Afshar |
| 2010/0261526 A1 | 10/2010 | Anderson et al. |
| 2010/0331685 A1 | 12/2010 | Stein et al. |
| 2011/0056763 A1 | 3/2011 | Tanase et al. |

(56) References Cited

U.S. PATENT DOCUMENTS

| | | |
|---|---|---|
| 2011/0075835 A1 | 3/2011 | Hill |
| 2011/0077055 A1 | 3/2011 | Pakula et al. |
| 2011/0141052 A1 | 6/2011 | Bernstein et al. |
| 2011/0161537 A1 | 6/2011 | Chang |
| 2011/0163985 A1 | 7/2011 | Bae et al. |
| 2011/0167391 A1 | 7/2011 | Momeyer et al. |
| 2012/0011436 A1 | 1/2012 | Jinkinson et al. |
| 2012/0105358 A1 | 5/2012 | Momeyer et al. |
| 2012/0105367 A1 | 5/2012 | Son et al. |
| 2012/0112894 A1 | 5/2012 | Yang et al. |
| 2012/0206246 A1 | 8/2012 | Cruz-Hernandez et al. |
| 2012/0206247 A1 | 8/2012 | Bhatia et al. |
| 2012/0229264 A1 | 9/2012 | Company Bosch et al. |
| 2012/0249462 A1 | 10/2012 | Flanagan et al. |
| 2012/0253698 A1 | 10/2012 | Cokonaj |
| 2012/0306631 A1 | 12/2012 | Hughes |
| 2013/0016855 A1 | 1/2013 | Lee et al. |
| 2013/0027359 A1 | 1/2013 | Schevin et al. |
| 2013/0038792 A1* | 2/2013 | Quigley ............... A61H 19/32 348/E5.009 |
| 2013/0096849 A1 | 4/2013 | Campbell et al. |
| 2013/0141382 A1 | 6/2013 | Simmons et al. |
| 2013/0208923 A1* | 8/2013 | Suvanto ............... H04R 3/005 381/122 |
| 2013/0275058 A1 | 10/2013 | Awad |
| 2013/0289994 A1 | 10/2013 | Newman et al. |
| 2013/0307786 A1 | 11/2013 | Heubel |
| 2014/0035736 A1 | 2/2014 | Weddle et al. |
| 2014/0056461 A1 | 2/2014 | Afshar |
| 2014/0064516 A1 | 3/2014 | Cruz-Hernandez et al. |
| 2014/0079248 A1 | 3/2014 | Short et al. |
| 2014/0085064 A1 | 3/2014 | Crawley et al. |
| 2014/0118125 A1 | 5/2014 | Bhatia |
| 2014/0118126 A1 | 5/2014 | Garg et al. |
| 2014/0119244 A1 | 5/2014 | Steer et al. |
| 2014/0125467 A1 | 5/2014 | Da Costa et al. |
| 2014/0139327 A1 | 5/2014 | Bau et al. |
| 2014/0176415 A1 | 6/2014 | Buuck et al. |
| 2014/0205260 A1 | 7/2014 | Lacroix et al. |
| 2014/0222377 A1 | 8/2014 | Bitan et al. |
| 2014/0226068 A1 | 8/2014 | Lacroix et al. |
| 2014/0253303 A1 | 9/2014 | Levesque |
| 2014/0292501 A1 | 10/2014 | Lim et al. |
| 2014/0300454 A1 | 10/2014 | Lacroix et al. |
| 2014/0340209 A1 | 11/2014 | Lacroix et al. |
| 2014/0347176 A1 | 11/2014 | Modarres et al. |
| 2015/0010176 A1* | 1/2015 | Schevciw ............... F21S 8/02 381/190 |
| 2015/0201294 A1 | 1/2015 | Risbert et al. |
| 2015/0049882 A1* | 2/2015 | Chiu ............... G06F 3/167 381/104 |
| 2015/0061846 A1 | 3/2015 | Yliaho |
| 2015/0070149 A1 | 3/2015 | Cruz-Hernandez et al. |
| 2015/0070151 A1 | 3/2015 | Cruz-Hernandez et al. |
| 2015/0070154 A1 | 3/2015 | Levesque et al. |
| 2015/0070260 A1 | 3/2015 | Saboune et al. |
| 2015/0077324 A1 | 3/2015 | Birnbaum et al. |
| 2015/0084752 A1 | 3/2015 | Heubel et al. |
| 2015/0116205 A1 | 4/2015 | Westerman et al. |
| 2015/0130767 A1 | 5/2015 | Myers et al. |
| 2015/0154966 A1* | 6/2015 | Bharitkar ............... G10L 19/008 381/23 |
| 2015/0204925 A1 | 7/2015 | Hernandez et al. |
| 2015/0208189 A1 | 7/2015 | Tsai |
| 2015/0216762 A1 | 8/2015 | Oohashi et al. |
| 2015/0234464 A1 | 8/2015 | Yliaho |
| 2015/0249888 A1 | 9/2015 | Bogdanov |
| 2015/0264455 A1 | 9/2015 | Granoto et al. |
| 2015/0268768 A1 | 9/2015 | Woodhull et al. |
| 2015/0324116 A1 | 11/2015 | Marsden et al. |
| 2015/0325116 A1 | 11/2015 | Umminger, III |
| 2015/0339898 A1 | 11/2015 | Saboune et al. |
| 2015/0341714 A1 | 11/2015 | Ahn et al. |
| 2015/0356981 A1* | 12/2015 | Johnson ............... H04R 1/46 704/231 |
| 2016/0004311 A1* | 1/2016 | Yliaho ............... G06F 3/165 381/99 |
| 2016/0007095 A1 | 1/2016 | Lacroix |
| 2016/0063826 A1 | 3/2016 | Morrell et al. |
| 2016/0070353 A1 | 3/2016 | Lacroix et al. |
| 2016/0070392 A1 | 3/2016 | Wang et al. |
| 2016/0074278 A1 | 3/2016 | Muench et al. |
| 2016/0097662 A1 | 4/2016 | Chang et al. |
| 2016/0132118 A1 | 5/2016 | Park et al. |
| 2016/0155305 A1 | 6/2016 | Barsilai et al. |
| 2016/0162031 A1 | 6/2016 | Westerman et al. |
| 2016/0179203 A1 | 6/2016 | Modarres et al. |
| 2016/0187987 A1* | 6/2016 | Ullrich ............... G08B 6/00 345/156 |
| 2016/0195930 A1 | 7/2016 | Venkatesan et al. |
| 2016/0227614 A1 | 8/2016 | Lissoni et al. |
| 2016/0239089 A1 | 8/2016 | Taninaka et al. |
| 2016/0246378 A1 | 8/2016 | Sampanes et al. |
| 2016/0277821 A1* | 9/2016 | Kunimoto ............... H04R 5/033 |
| 2016/0291731 A1 | 10/2016 | Liu et al. |
| 2016/0305996 A1 | 10/2016 | Martens et al. |
| 2016/0328065 A1 | 11/2016 | Johnson et al. |
| 2016/0358605 A1 | 12/2016 | Ganong, III et al. |
| 2017/0052593 A1 | 2/2017 | Jiang et al. |
| 2017/0078804 A1 | 3/2017 | Guo et al. |
| 2017/0083096 A1 | 3/2017 | Rihn et al. |
| 2017/0090572 A1 | 3/2017 | Holenarsipur et al. |
| 2017/0090573 A1 | 3/2017 | Hajati et al. |
| 2017/0097381 A1 | 4/2017 | Stephens et al. |
| 2017/0153760 A1 | 6/2017 | Chawda et al. |
| 2017/0168574 A1 | 6/2017 | Zhang |
| 2017/0168773 A1 | 6/2017 | Keller et al. |
| 2017/0169674 A1* | 6/2017 | Macours ............... G06F 3/016 |
| 2017/0180863 A1* | 6/2017 | Biggs ............... H04S 1/005 |
| 2017/0220197 A1 | 8/2017 | Matsumoto et al. |
| 2017/0256145 A1 | 9/2017 | Macours et al. |
| 2017/0277350 A1 | 9/2017 | Wang et al. |
| 2017/0277360 A1 | 9/2017 | Breedvelt-Shouten et al. |
| 2017/0031495 A1 | 12/2017 | Tse |
| 2017/0357440 A1 | 12/2017 | Tse |
| 2018/0021811 A1 | 1/2018 | Kutej et al. |
| 2018/0033946 A1 | 2/2018 | Kemppinen et al. |
| 2018/0059733 A1 | 3/2018 | Gault et al. |
| 2018/0059793 A1 | 3/2018 | Hajati |
| 2018/0067557 A1* | 3/2018 | Robert ............... G06F 1/1684 |
| 2018/0074637 A1 | 3/2018 | Rosenberg et al. |
| 2018/0082673 A1 | 3/2018 | Tzanetos |
| 2018/0084362 A1 | 3/2018 | Zhang et al. |
| 2018/0095596 A1 | 4/2018 | Turgeman |
| 2018/0139538 A1* | 5/2018 | Macours ............... H03F 3/183 |
| 2018/0151036 A1 | 5/2018 | Cha et al. |
| 2018/0158289 A1 | 6/2018 | Vasilev et al. |
| 2018/0159452 A1 | 6/2018 | Eke et al. |
| 2018/0159457 A1 | 6/2018 | Eke |
| 2018/0159545 A1 | 6/2018 | Eke et al. |
| 2018/0160227 A1 | 6/2018 | Lawrence et al. |
| 2018/0165925 A1 | 6/2018 | Israr et al. |
| 2018/0178114 A1 | 6/2018 | Mizuta et al. |
| 2018/0182212 A1 | 6/2018 | Li et al. |
| 2018/0183372 A1 | 6/2018 | Li et al. |
| 2018/0194369 A1 | 7/2018 | Lisseman et al. |
| 2018/0196567 A1 | 7/2018 | Klein et al. |
| 2018/0224963 A1 | 8/2018 | Lee et al. |
| 2018/0227063 A1 | 8/2018 | Heubel et al. |
| 2018/0237033 A1 | 8/2018 | Hakeem et al. |
| 2018/0206282 A1 | 9/2018 | Singh |
| 2018/0253123 A1 | 9/2018 | Levesque et al. |
| 2018/0255411 A1 | 9/2018 | Lin et al. |
| 2018/0267897 A1 | 9/2018 | Jeong |
| 2018/0294757 A1 | 10/2018 | Feng et al. |
| 2018/0301060 A1 | 10/2018 | Israr et al. |
| 2018/0304310 A1 | 10/2018 | Long et al. |
| 2018/0321056 A1 | 11/2018 | Yoo et al. |
| 2018/0321748 A1 | 11/2018 | Rao et al. |
| 2018/0323725 A1 | 11/2018 | Cox et al. |
| 2018/0329172 A1 | 11/2018 | Tabuchi |
| 2018/0335848 A1 | 11/2018 | Moussette et al. |

(56) References Cited

U.S. PATENT DOCUMENTS

| | | |
|---|---|---|
| 2018/0367897 A1 | 12/2018 | Bjork et al. |
| 2019/0020760 A1 | 1/2019 | DeBates et al. |
| 2019/0033348 A1 | 1/2019 | Zeleznik et al. |
| 2019/0035235 A1 | 1/2019 | Da Costa et al. |
| 2019/0227628 A1 | 1/2019 | Rand et al. |
| 2019/0044651 A1 | 2/2019 | Nakada |
| 2019/0051229 A1 | 2/2019 | Ozguner et al. |
| 2019/0064925 A1 | 2/2019 | Kim et al. |
| 2019/0069088 A1 | 2/2019 | Seiler |
| 2019/0073078 A1 | 3/2019 | Sheng et al. |
| 2019/0102031 A1 | 4/2019 | Shutzberg et al. |
| 2019/0103829 A1 | 4/2019 | Vasudevan et al. |
| 2019/0138098 A1 | 5/2019 | Shah |
| 2019/0163234 A1 | 5/2019 | Kim et al. |
| 2019/0196596 A1 | 6/2019 | Yokoyama et al. |
| 2019/0206396 A1 | 7/2019 | Chen |
| 2019/0215349 A1 | 7/2019 | Adams et al. |
| 2019/0220095 A1 | 7/2019 | Ogita et al. |
| 2019/0228619 A1 | 7/2019 | Yokoyama et al. |
| 2019/0114496 A1 | 8/2019 | Lesso |
| 2019/0235629 A1 | 8/2019 | Hu et al. |
| 2019/0253031 A1 | 8/2019 | Vellanki et al. |
| 2019/0294247 A1 | 9/2019 | Hu et al. |
| 2019/0295755 A1 | 9/2019 | Konradi et al. |
| 2019/0296674 A1 | 9/2019 | Janko et al. |
| 2019/0297418 A1 | 9/2019 | Stahl |
| 2019/0305851 A1 | 10/2019 | Vegas-Olmos et al. |
| 2019/0311590 A1 | 10/2019 | Doy et al. |
| 2019/0341903 A1 | 11/2019 | Kim |
| 2019/0384898 A1 | 12/2019 | Chen et al. |
| 2020/0117506 A1 | 4/2020 | Chan |
| 2020/0139403 A1 | 5/2020 | Palit |
| 2020/0150767 A1 | 5/2020 | Karimi Eskandary et al. |
| 2020/0218352 A1 | 7/2020 | Macours et al. |
| 2020/0231085 A1 | 7/2020 | Kunii et al. |
| 2020/0306796 A1 | 10/2020 | Lindemann et al. |
| 2020/0313529 A1 | 10/2020 | Lindemann |
| 2020/0313654 A1 | 10/2020 | Marchais et al. |
| 2020/0314969 A1 | 10/2020 | Marchais et al. |
| 2020/0342724 A1 | 10/2020 | Marchais et al. |
| 2020/0348249 A1 | 11/2020 | Marchais et al. |
| 2020/0395908 A1 | 12/2020 | Schindler et al. |
| 2020/0403546 A1 | 12/2020 | Janko et al. |
| 2021/0108975 A1 | 4/2021 | Peso Parada et al. |
| 2021/0125469 A1 | 4/2021 | Alderson |
| 2021/0153562 A1 | 5/2021 | Fishwick et al. |
| 2021/0157436 A1 | 5/2021 | Peso Parada et al. |
| 2021/0174777 A1 | 6/2021 | Marchais et al. |
| 2021/0175869 A1 | 6/2021 | Taipale |
| 2021/0200316 A1 | 7/2021 | Das et al. |
| 2021/0325967 A1 | 10/2021 | Khenkin et al. |
| 2021/0328535 A1 | 10/2021 | Khenkin et al. |
| 2021/0360347 A1 | 11/2021 | Aschieri |
| 2021/0365118 A1 | 11/2021 | Rajapurkar et al. |
| 2022/0026989 A1 | 1/2022 | Rao et al. |
| 2022/0328752 A1 | 10/2022 | Lesso et al. |
| 2022/0404398 A1 | 12/2022 | Reynaga et al. |
| 2022/0408181 A1 | 12/2022 | Hendrix et al. |

FOREIGN PATENT DOCUMENTS

| | | |
|---|---|---|
| CN | 104811838 A | 7/2015 |
| CN | 204903757 U | 12/2015 |
| CN | 105264551 A | 1/2016 |
| CN | 106438890 A | 2/2017 |
| CN | 103403796 A | 7/2017 |
| CN | 106950832 A | 7/2017 |
| CN | 107665051 A | 2/2018 |
| CN | 107835968 A | 3/2018 |
| CN | 210628147 U | 5/2020 |
| CN | 114237414 A | 3/2022 |
| EP | 0784844 B1 | 6/2005 |
| EP | 2306269 A1 | 4/2011 |
| EP | 2363785 A1 | 9/2011 |
| EP | 2487780 A1 | 8/2012 |
| EP | 2600225 A1 | 6/2013 |
| EP | 2846218 A1 | 3/2015 |
| EP | 2846229 A2 | 3/2015 |
| EP | 2846329 A1 | 3/2015 |
| EP | 2988528 A1 | 2/2016 |
| EP | 3125508 A1 | 2/2017 |
| EP | 3379382 A1 | 9/2018 |
| EP | 3546035 A1 | 10/2019 |
| EP | 3937379 A1 | 1/2022 |
| GB | 201620746 A | 1/2017 |
| GB | 2526881 B | 10/2017 |
| GB | 2606309 A | 11/2022 |
| IN | 201747044027 | 8/2018 |
| IN | 113268138 A | 8/2021 |
| JP | H02130433 B2 | 5/1990 |
| JP | 08149006 A | 6/1996 |
| JP | H10184782 A | 7/1998 |
| JP | 6026751 B2 | 11/2016 |
| JP | 6250985 | 12/2017 |
| JP | 6321351 | 5/2018 |
| KR | 20120126446 A | 11/2012 |
| WO | 2013104919 A1 | 7/2013 |
| WO | 2013186845 A1 | 12/2013 |
| WO | 2014018086 A1 | 1/2014 |
| WO | 2014094283 A1 | 6/2014 |
| WO | 2016105496 A1 | 6/2016 |
| WO | 2016164193 A1 | 10/2016 |
| WO | 2017034973 A1 | 3/2017 |
| WO | 2017113651 A1 | 7/2017 |
| WO | 2017113652 A1 | 7/2017 |
| WO | 2018053159 A1 | 3/2018 |
| WO | 2018067613 A1 | 4/2018 |
| WO | 2018125347 A1 | 7/2018 |
| WO | 2020004840 A1 | 1/2020 |
| WO | 2020055405 A1 | 3/2020 |

OTHER PUBLICATIONS

Office Action of the Intellectual Property Office, ROC (Taiwan) Patent Application No. 107115475, dated Apr. 30, 2021.
First Office Action, China National Intellectual Property Administration, Patent Application No. 2019800208570, dated Jun. 3, 2021.
International Search Report and Written Opinion of the International Searching Authority, International Application No. PCT/US2021/021908, dated Jun. 9, 2021.
Notice of Preliminary Rejection, Korean Intellectual Property Office, Application No. 10-2019-7036236, dated Jun. 29, 2021.
Combined Search and Examination Report, United Kingdom Intellectual Property Office, Application No. GB2018051.9, dated Jun. 30, 2021.
Communication pursuant to Rule 164(2)(b) and Article 94(3) EPC, European Patent Office, Application No. 18727512.8, dated Jul. 8, 2021.
Gottfried Behler: "Measuring the Loudspeaker's Impedance during Operation for the Derivation of the Voice Coil Temperature", AES Convention Preprint, Feb. 25, 1995 (Feb. 25, 1995), Paris.
First Office Action, China National Intellectual Property Administration, Patent Application No. 2019800211287, dated Jul. 5, 2021.
Steinbach et al., Haptic Data Compression and Communication, IEEE Signal Processing Magazine, Jan. 2011.
Pezent et al., Syntacts Open-Source Software and Hardware for Audio-Controlled Haptics, IEEE Transactions on Haptics, vol. 14, No. 1, Jan.-Mar. 2021.
Examination Report under Section 18(3), United Kingdom Intellectual Property Office, Application No. GB2018051.9, dated Nov. 5, 2021.
Jaijongrak et al., A Haptic and Auditory Assistive User Interface: Helping the Blinds on their Computer Operations, 2011 IEEE International Conference on Rehabilitation Robotics, Rehab Week Zurich, ETH Zurich Science City, Switzerland, Jun. 29-Jul. 1, 2011.
Lim et al., An Audio-Haptic Feedbacks for Enhancing User Experience in Mobile Devices, 2013 IEEE International Conference on Consumer Electronics (ICCE).
Weddle et al., How Does Audio-Haptic Enhancement Influence Emotional Response to Mobile Media, 2013 Fifth International Workshop on Quality of Multimedia Experience (QoMEX), QMEX 2013.

(56) References Cited

OTHER PUBLICATIONS

Danieau et al., Enhancing Audiovisual Experience with Haptic Feedback: A Survey on HAV, IEEE Transactions on Haptics, vol. 6, No. 2, Apr.-Jun. 2013.
Danieau et al., Toward Haptic Cinematography: Enhancing Movie Experiences with Camera-Based Haptic Effects, IEEE Computer Society, IEEE MultiMedia, Apr.-Jun. 2014.
Final Notice of Preliminary Rejection, Korean Patent Office, Application No. 10-2019-7036236, dated Nov. 29, 2021.
Examination Report under Section 18(3), United Kingdom Intellectual Property Office, Application No. GB2018050.1, dated Dec. 22, 2021.
International Search Report and Written Opinion of the International Searching Authority, International Application No. PCT/GB2019/050964, dated Sep. 3, 2019.
Communication Relating to the Results of the Partial International Search, and Provisional Opinion Accompanying the Partial Search Result, of the International Searching Authority, International Application No. PCT/US2018/031329, dated Jul. 20, 2018.
Combined Search and Examination Report, UKIPO, Application No. GB1720424.9, dated Jun. 5, 2018.
International Search Report and Written Opinion of the International Searching Authority, International Application No. PCT/GB2019/052991, dated Mar. 17, 2020, received by Applicant Mar. 19, 2020.
Communication Relating to the Results of the Partial International Search, and Provisional Opinion Accompanying the Partial Search Result, of the International Searching Authority, International Application No. PCT/GB2020/050822, dated Jul. 9, 2020.
International Search Report and Written Opinion of the International Searching Authority, International Application No. PCT/US2020/024864, dated Jul. 6, 2020.
International Search Report and Written Opinion of the International Searching Authority, International Application No. PCT/GB2020/051035, dated Jul. 10, 2020.
International Search Report and Written Opinion of the International Searching Authority, International Application No. PCT/GB2020/050823, dated Jun. 30, 2020.
International Search Report and Written Opinion of the International Searching Authority, International Application No. PCT/GB2020/051037, dated Jul. 9, 2020.
International Search Report and Written Opinion of the International Searching Authority, International Application No. PCT/GB2020/050822, dated Aug. 31, 2020.
International Search Report and Written Opinion of the International Searching Authority, International Application No. PCT/GB2020/051438, dated Sep. 28, 2020.
First Examination Opinion Notice, State Intellectual Property Office of the People's Republic of China, Application No. 201880037435.X, dated Dec. 31, 2020.
International Search Report and Written Opinion of the International Searching Authority, International Application No. PCT/US2020/056610, dated Jan. 21, 2021.
Second Office Action, National Intellectual Property Administration, PRC, Application No. 2019800208570, dated Jan. 19, 2022.
Examination Report under Section 18(3), United Kingdom Intellectual Property Office, Application No. GB2106247.6, dated Mar. 31, 2022.
Combined Search and Examination Report under Sections 17 and 18(3), UKIPO, Application No. GB2210174.5, dated Aug. 1, 2022.
Examination Report under Sections 17 and 18(3), UKIPO, Application No. GB2112207.2, dated Aug. 18, 2022.
International Search Report and Written Opinion of the International Searching Authority, International Application No. PCT/US2022/030541, dated Sep. 1, 2022.
Vanderborght, B. et al., Variable impedance actuators: A review; Robotics and Autonomous Systems 61, Aug. 6, 2013, pp. 1601-1614.
International Search Report and Written Opinion of the International Searching Authority, International Application No. PCT/US2022/033190, dated Sep. 8, 2022.
International Search Report and Written Opinion of the International Searching Authority, International Application No. PCT/US2022/033230, dated Sep. 15, 2022.
Examination Report under Section 18(3), UKIPO, Application No. GB2115048.7, dated Aug. 24, 2022.
Communication pursuant to Article 94(3) EPC, European Patent Office, Application No. 18727512.8, dated Sep. 26, 2022.
Examination Report under Section 18(3), UKIPO, Application No. GB2112207.2, dated Nov. 7, 2022.
Examination Report, Intellectual Property India, Application No. 202117019138, dated Jan. 4, 2023.
Examination Report under Section 18(3), UKIPO, Application No. GB2113228.7, dated Feb. 10, 2023.
Examination Report under Section 18(3), UKIPO, Application No. GB2113154.5, dated Feb. 17, 2023.
First Office Action, China National Intellectual Property Administration, Application No. 2019107179621, dated Jan. 19, 2023.
Examination Report under Section 18(3), UKIPO, Application No. GB2117488.3, dated Apr. 27, 2023.
Second Office Action, National Intellectual Property Administration, PRC, Application No. 2019107179621, dated May 24, 2023.
Examination Report under Section 18(3), UKIPO, Application No. GB2113228.7, dated Jun. 28, 2023.
Combined Search and Examination Report under Sections 17 and 18(3), UKIPO, Application No. GB2204956.3, dated Jul. 24, 2023.
Examination Report under Section 17, UKIPO, Application No. GB2311104.0 dated Sep. 4, 2023.
Examination Report under Section 17, UKIPO, Application No. GB2311103.2 dated Sep. 11, 2023.
Notice of Preliminary Rejection, Korean Intellectual Property Office, Application No. 10-2023-7029306, dated Sep. 19, 2023.

* cited by examiner

HAPTIC OUTPUT SYSTEMS

This application is a continuation of U.S. patent application Ser. No. 16/103,018, filed Aug. 14, 2018, which is incorporated by reference herein in its entirety.

FIELD OF THE INVENTION

The present disclosure relates to the field of haptic output systems. In particular, the present disclosure relates to a system for deriving a haptic drive signal for driving a haptic actuator.

BACKGROUND

Modern computing devices such as smartphones, tablet computers, smart watches and the like are increasingly being provided with haptic output systems in addition to conventional video and audio output systems such as screens and speakers. Such haptic output systems provide mechanical stimulation or mechanical outputs that can be felt by a user of the device. These haptic outputs may be used, for example, to simulate the feeling of a mechanical button being depressed or clicked.

Additionally, virtual reality (VR) and augmented reality (AR) devices may employ haptic output systems as well as video and audio output systems, to produce a multi-sensory user experience that may be more immersive and realistic, and therefore richer, than in systems which provide only audio and visual outputs.

The haptic output can be achieved by driving an actuator with a pulse signal having a predetermined waveform. The resulting vibration of the actuator is conducted to the body of the device in order to induce the sensation of mechanical movement. The driving signal is a carefully designed waveform or pulse that may be generated by a haptic amplifier e.g. a high voltage amplifier in order to drive the haptic actuator.

There are a number of problems associated with previously proposed systems for generating haptic drive signals. For example, synchronization or a specified time relationship between the audio and haptic playback can be disrupted due to the way in which the audio and haptic information is derived and communicated to the haptic output transducer. The techniques described herein generally seek to improve on the previously proposed system and/or seek to mitigate the problems associated with previously proposed systems.

SUMMARY

According to an example of a first aspect there is provided a drive circuit comprising: an input configured to receive an input signal representing audio information and haptic information;
- an audio output amplifier configured to generate an audio drive signal based on the audio information represented in the input signal; and
- a haptic output amplifier configured to generate a haptic drive signal based on the haptic information represented in the input signal.

The input signal may comprise audio information representing an audio output signal to be output by the audio output transducer and haptic information representing a haptic output signal to be output by a haptic output transducer.

The drive circuit may further comprise a haptic recovery portion for recovering the haptic information from the input signal and/or an audio recovery portion for recovering the audio information from the input signal. The haptic recovery portion may be configured to derive the haptic information from a designated portion of the input signal. The designated portion may comprise at least one carrier frequency of the input signal. The haptic recovery portion may be configured to perform a demodulation process, such as an FM demodulation process, in order to derive the haptic information. The designated portion may be spread across a plurality of different carrier frequencies of the channel. Thus, the recovery portion may be configured to perform a spread spectrum demodulation process to derive the haptic information.

According to one or more example the input signal is carried by a single channel. The channel may be, for example, an audio channel. The designated portion may comprise one or more carrier frequencies of the channel above 16 kHz. The channel is provided, for example, by an electrical serial bus interface.

According to one or more example the drive circuit further comprises a first filter configured to receive the input signal, to filter audio information comprised in the input signal and to output a filtered signal to the haptic output amplifier. According to one or more example the drive circuit may comprise a second filter configured to receive the input signal, to filter haptic information comprised in the input signal and to output a filtered signal to the audio output amplifier.

The haptic information may be considered to represent a magnitude and/or a direction of a haptic signal to be output by a haptic output transducer. The haptic information may define a pulse signal or waveform for driving a haptic output transducer.

According to one or more example the drive circuit comprises a transformation unit, wherein transformation unit is configured to receive a haptic drive signal representing the haptic information derived by the haptic amplifier and to modify the haptic drive signal based on one or more characterisation parameters in order to generate a modified haptic drive signal. The characterisation parameters may be considered to represent data relating to one or more of: a mounting position of a haptic output transducer, one or more characteristics of the haptic actuator and one or more characteristics of a host device.

The input signal may be considered to be a first input signal and the drive circuit may be configured to receive first and second input signals. In this case, haptic information may be carried on a portion of either or both of the first and second input signals. Furthermore, the first and/or second input signal may represent system- or application-related metadata.

According to one or more examples the drive circuit may further comprise a synchronisation module, the synchronisation module arranged to synchronise the output of the audio drive signal and the haptic drive signal.

According to an example of a second aspect there is provided a signal processor, the signal processor being configured to output a mixed signal via a single channel, the mixed signal comprising i) an audio signal to be output by an audio output transducer and ii) a haptic signal to be output by a haptic output transducer.

Thus, the signal processor may be configured to encode audio information onto the channel. The signal processor may be configured to filter audio information at one or more designated carrier frequencies of the channel. The signal processor may be configured to encode haptic information onto one or more designated carrier frequencies of the channel.

The signal processor may be configured to select said mixed signal from one or more candidate mixed signals stored in a memory. Alternatively or additionally the signal processor may be configured to generate said mixed signal during a process of running an application on the signal processor or on a processor which interfaces with the signal processor.

According to one or more examples of the second aspect the signal processor may be configured to encode synchronisation information onto the channel, preferably at least an audio sync marker to indicate the point in an audio signal that playback of a haptic output should commence, and/or a haptic sync marker to indicate the start of a haptic waveform to be output as a haptic drive signal.

According to an example of a third aspect there is provided a system comprising a drive circuit according to an example of the first aspect and a signal processor according to an example of the second aspect.

According to an example of a fourth aspect there is provided a system comprising a drive circuit according to an example of the first aspect and further comprising: at least one haptic output transducer, wherein the haptic amplifier is configured to generate a haptic drive signal representing the haptic information contained in the input signal and to output the haptic drive signal to one or more of the haptic output transducers.

The system may further comprise at least one audio output transducer, wherein the audio amplifier is configured to generate an audio drive signal representing the audio information contained in the input signal and to output the haptic drive signal to one or more of the haptic output transducers.

According to an example of any of the above aspects the drive circuit may be configured to receive first and second input signals. Such an example may be particularly applicable to a stereo implementation forming a part of a system comprising first and second audio output transducers. In this case, the haptic information may be carried on a portion of either or both of the first and second input signals. Thus, the system may comprise first and second audio output transducers and wherein the first input signal comprises audio information representing an audio output to be output by the first audio transducer and the second input signal comprises audio information representing an audio output to be output by the second audio transducer.

According to an example of a fifth aspect there is provided a drive module for providing a haptic drive signal to a haptic output transducer, the drive module comprising:

a haptic recovery portion configured to receive an input signal via a single channel interface between the drive module and a signal processor, wherein the haptic recovery portion is configured to derive haptic information from a designated portion of the input signal.

BRIEF DESCRIPTION OF DRAWINGS

For a better understanding of the present invention and to show how the same may be carried into effect, reference will now be made by way of example to the accompanying drawings in which.

DETAILED DESCRIPTION

The description below sets forth examples according to the present disclosure. Further example embodiments and implementations will be apparent to those having ordinary skill in the art. Further, those having ordinary skill in the art will recognize that various equivalent techniques may be applied in lieu of, or in conjunction with, the examples discussed below, and all such equivalents should be deemed as being encompassed by the present disclosure.

The techniques described herein can be implemented in a wide range of devices and systems.

Figure 1A:
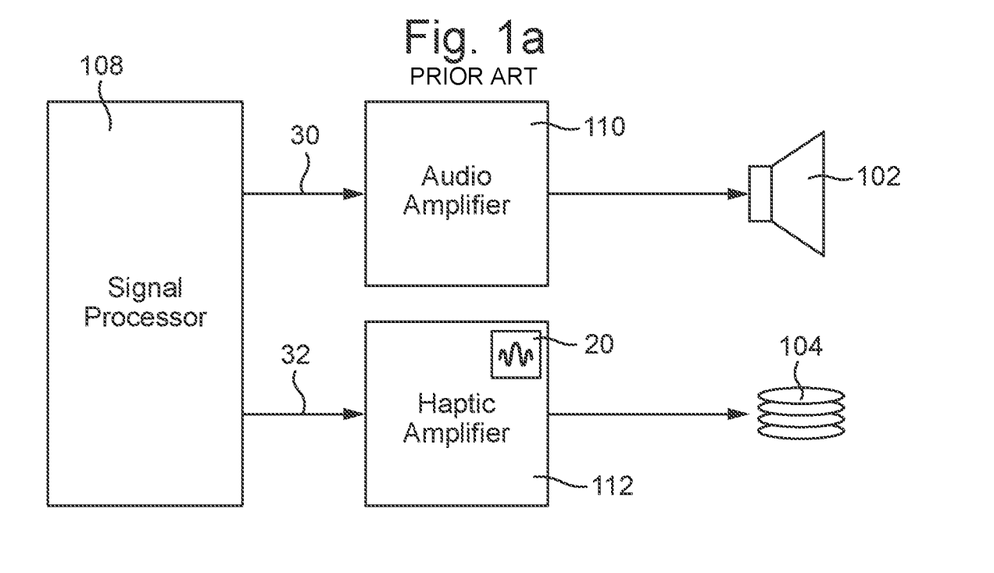
FIGS. 1a and 1b are block diagrams of a system architecture of a system for providing audio and haptic outputs.

FIG. 1a is a block diagram of a system architecture of a system for providing audio and haptic outputs. The system forms part of a device having an audio output transducer 102 and a haptic output transducer 104. The device may be a mobile telephone, tablet or laptop computer, smart watch, virtual reality (VR) or augmented reality (AR) device, for example.

The device includes a signal processor 108 which may be, for example a digital signal processor (DSP). The signal processor may form a part of, or may interface, with an applications processor AP (not shown) which runs an operating environment of the device to allow software applications such as games to be executed by the device. The signal processor 108 is connected via a first signal path 30 with an audio output amplifier 110. The first signal path may be, for example, an electrical serial bus interface such as I$^2$S or SPI. The audio output amplifier 110 is configured to output an audio drive signal to the audio output transducer 102 in order to cause the audio output transducer to generate an audio effect. The signal processor 108 is also connected via a second signal path 32 with a haptic output amplifier 112. The haptic amplifier 112 is configured to output a haptic output drive signal to drive the haptic output transducer 104.

An application processor typically receives user inputs. The user inputs may include one or more of: touch and/or gestural user inputs that can be detected by a touch-sensitive surface (e.g. a touch screen) of the device (not shown); kinetic user inputs such as rotating or tilting the device that can be detected by a sensor such as an accelerometer or gyroscope of the device (also not shown); and audio user inputs such as spoken commands that can be detected by a sensor such as a microphone of the device (also not shown). In response to detection of a user input the application is operative to generate appropriate outputs at the device. For example, the application may be operative to cause images displayed on a display of the device (not shown) to be updated, and to cause appropriate audio effects to be output by the audio output transducer 102. The application may also be operative to cause appropriate haptic outputs to be provided by the haptic output transducer 104 in response to detection of user inputs.

For example, in a driving game application, the user may interact with a touch screen of the device, e.g. by touching a graphical representation of an accelerator pedal or a brake pedal presented on a touch screen of the device in order to accelerate or brake a vehicle within the game. Such touches are detected by the touch screen and result in the images displayed on the display of the device being updated by the application to give a visual indication that the vehicle is accelerating or braking. The updates to the images displayed on the display may be accompanied by appropriate audio effects being output by the output audio transducer 102, such as an engine revving effect when the accelerator pedal is touched, or a tyre screech effect when the brake pedal is touched.

In order to steer the vehicle the user may rotate the device in a clockwise direction to turn left or an anticlockwise direction to turn right. In response to detection of such kinetic inputs by the accelerometer and/or gyroscope of the device, the images displayed on the display are updated as appropriate by the application to give a visual indication of the movement of the vehicle. In addition, appropriate audio effects such as a tyre screech effect may be output by the output audio transducer 102.

Audio user input such as voice commands may additionally be used, for example to perform special functions such as firing a weapon. On detection of a valid voice command or other audio user input, the images displayed on the display may be updated as appropriate to give a visual indication of the effect of the command, and appropriate audio effects such as a gunshot effect may be output by the output audio transducer 102.

The application may also be configured to make use of the haptic output transducer 104 to provide additional sensory information to the user. For example, in the driving game application example discussed above, in addition to updating the images displayed on the display and outputting appropriate audio effects, the device may also provide haptic outputs in response to the user inputs. For example, the haptic output transducer 104 may be actuated to cause the device to vibrate at the same time as the images displayed on the display are updated and the audio effect is output by the output audio transducer 102, thereby providing additional sensory information to the user.

Applications such as games that run on devices that include haptic output systems have to be designed and programmed specifically to take advantage of the haptic capabilities of the device. The relationship between the audio playback and the haptic playback is situation specific. For example, in some cases it may be desirable to synchronise the audio effect with the playback of the haptic waveform. For example, in the example of a car racing game, the event of a car crashing into a barrier may generate both a haptic output at substantially the same time as an audio output. In other cases the playback of acoustic sound and a haptic effect are not coincident or they may be delayed by a fixed amount of time. For example, firing a slingshot or catapult may induce a force a certain amount of time before the main acoustic event is heard.

A number of solutions have been proposed for storing and communicating haptic information within a device which provides audio and haptic outputs.

According to a previously proposed system for example as illustrated in FIG. 1*a*, haptic information—e.g. one or more haptic waveforms—is stored locally in a memory 20 of the haptic amplifier. Thus, a trigger or command signal is sent e.g. from the signal processor to the haptic amplifier in order to cause the haptic amplifier to select haptic information and to generate a haptic drive signal for causing the intended haptic effect. However, according to this arrangement, only a limited number of waveforms may be stored on the haptic amplifier and, furthermore, waveform playback may be difficult to synchronise with the audio effects.

Figure 1B:
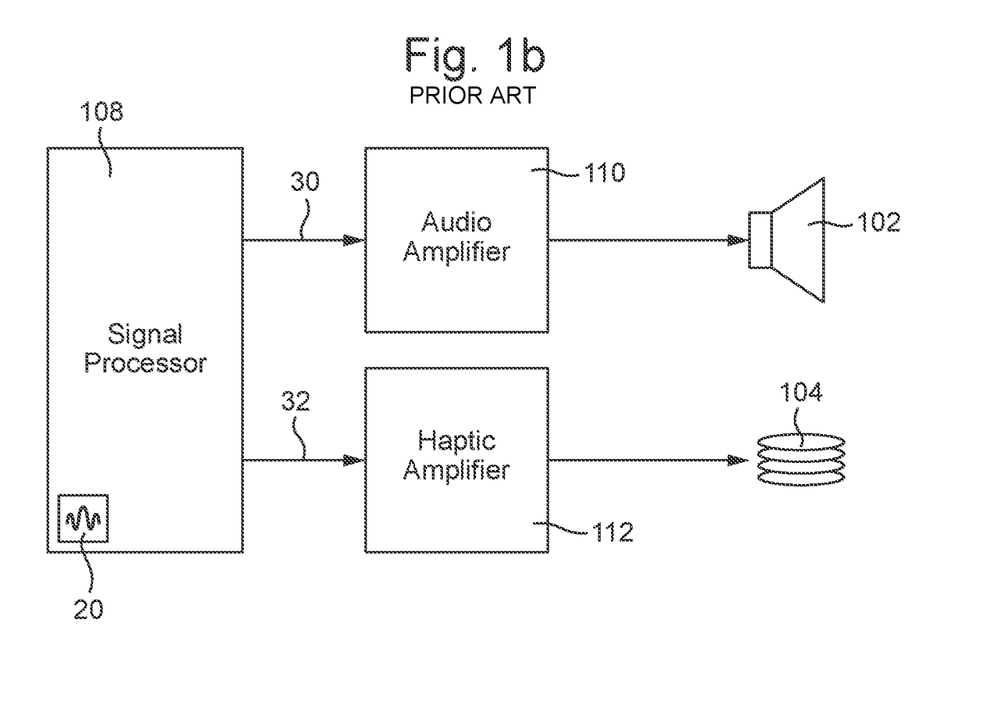

According to another example of a previously proposed system as illustrated in FIG. 1*b*, haptic content is stored in a memory 20 associated with the signal processor (or with the applications processor). Alternatively, the haptic content may be derived at the signal processor in real time. In either case, haptic information must be sent from the signal processor to the haptic amplifier. This will typically require modification to the existing operating system in order to support a secondary interface between the signal processor and the haptic amplifier for the transmission of haptic content. Thus, the second signal path 32 will comprise a second electrical serial bus interface such as I$^2$S or SPI. It will be appreciated that modifications to an operating system can take a long time to standardize and this may delay or deter the uptake of such a system for providing haptic sensory output.

Figure 2:
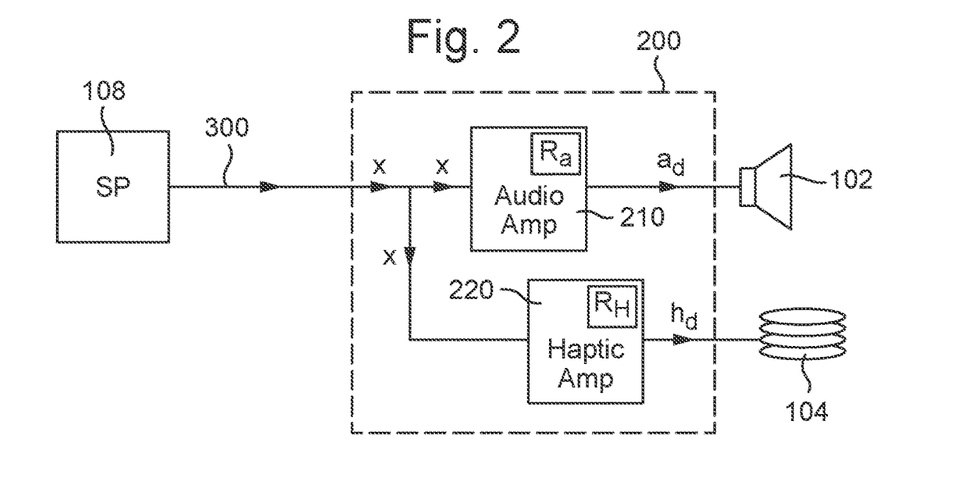
FIG. 2 is a block diagram of a system architecture for providing audio and haptic outputs according to a present example.

FIG. 2 is a block diagram of a system architecture for providing audio and haptic outputs according to a present example. The system comprises a drive circuit or drive module 200 according to an example of the first aspect. The system may form part of a device having an audio output transducer 102 and a haptic output transducer 104. The device may be a mobile telephone, tablet or laptop computer, smart watch, virtual reality (VR) or augmented reality (AR) device, for example. Alternatively, the system may be implemented by multiple devices.

The system includes a signal processor 108 which may be, for example a digital signal processor (DSP). The signal processor may form a part of, or may interface, with an applications processor AP (not shown) which runs an operating environment of a user device to allow software applications such as games to be executed by the user device. The signal processor 108 is connected to the drive circuit 200 via a signal path 300. The signal path 300 may be provided by, for example, an electrical serial bus interface such as I$^2$S or SPI.

The drive circuit 200 receives an input signal x via the signal path 300. The input signal x is fed to an audio amplifier 210. The audio amplifier 210 is configured to generate an audio drive signal $a_d$ based on the audio data contained in the input signal. In this example the audio amplifier is configured to receive the input signal and to derive the audio data from the input signal. Thus, the audio amplifier can be considered to comprise an audio data recovery portion $R_a$ for recovering the audio data from the input signal. The audio drive signal generated by the audio amplifier is output to the audio output transducer 102 in order to cause the audio output transducer to generate an audio effect. The input signal x is also fed to a haptics amplifier 220. The haptics amplifier 220 is configured to generate a haptic drive signal $h_d$. In this example the haptics amplifier 220 is configured to receive the input signal x and to derive the haptic information from the input signal x. Thus the haptics amplifier can be considered to comprise a haptic data recovery portion $R_H$ for recovering e.g. decoding the haptic data from the input signal. The haptic information defines at least one haptic effect to be output by the haptic actuator. For example, the haptic information may define a pulse signal or waveform. The haptic drive signal is output to the haptic output transducer 104 in order to drive the haptic output transducer and thus generate a haptic effect.

It will be appreciated that in one or more other examples the process of deriving the audio and/or haptic information from the input signal may be at least partially performed by a unit or portion that is implemented separately from the respective amplifier. For example, one or more examples may comprise a filer which is provided in advance of one or both of the amplifiers and is configured to filter or exclude the signal representing the type of data (haptic or audio) not required by the subsequent amplifier (audio or haptic). Thus, the audio amplifier and/or the haptic amplifier may be configured to receive a filtered input signal from which it is possible to derive or decode the relevant audio or haptic information. According to one or more examples a recovery portion R may be provided in advance of one or both of the amplifiers and is configured to recover or decode the data that is required by the subsequent amplifier. Such a recovery portion which may be configured to decode the required data from the input signal (e.g. a designated portion of the input signal or channel) may be provided separately or in conjunction with a filter for excluding certain portions of the channel.

In a further aspect, the system may be configured to perform a synchronisation of the audio and haptics signals to be output by the transducers. For example, the performance or responsiveness of the audio output transducer and/or the haptics output transducer may vary over the lifetime of the device. In addition, the action of recovering the haptics information or the audio information from the data channel 300 may result in the introduction of a delay or latency into the system between the haptics and audio paths.

This may be addressed by performing a synchronisation step, wherein the audio amplifier 210 and/or the haptics amplifier 220 are configured to adjust the output audio and haptic output signals to ensure synchronous output.

In one aspect, the operation of the audio and haptics transducers may be continuously monitored, e.g. using current/voltage monitoring, to determine any transducer-related latency which needs to be accounted for in the output of the haptics and audio signals.

Additionally or alternatively, the system may monitor the steps of decoding or recovering the haptics and/or audio information, to account for any variations in the recovery and output paths to the audio output transducer 102 and the haptics output transducer 104. This may be facilitated by the embedding of a synchronisation marker in the haptics and/or audio information, to allow for the haptics output to be synchronised with the audio output.

Such synchronisation will ensure that the haptics output will be time-aligned with the corresponding audio output, to provide for the best user experience. For example, in the context of a video game application where an action such as a gunshot is triggered, the haptics output for the gunshot is synchronised with the audio output of the gunshot. It will be understood that such a synchronisation process may be performed by a synchronisation module. Such a synchronisation module may be provided as a separate processing module, or may be provided in the audio amplifier 210 and/or the haptics amplifier 220, for example as part of the respective recovery portions Ra, $R_H$.

The following is an example of a system which can be used to compensate for any delays or latency experienced in system operation, e.g. because (a) the recovery process for the haptic signal takes longer than that of the recovery for the audio signal and is variable (for example due to the use of additional filter or demodulation stages); and/or (b) the time to send the haptic signal is slower than real time (for example if the haptic signal takes 1.5× the time of the audio signal e.g. due to bandwidth limitations).

If a delay is to be expected then the following system could be used:

1. The haptic waveform can be encoded with the audio in such a manner that it will be decoded before the corresponding point of audio (this may be for example as part of a dynamic look-ahead haptics system).
2. In addition to the haptic and audio signal streams, synchronization markers may be added to the data transmitted. Such synchronisation markers may be provided as metadata encoded within the haptic and audio streams, or may be provided as part of an additional side channel transmitted in parallel to the haptic and audio data. For example:
   a. An audio sync marker may be added to the audio stream to indicate that the playback of the incoming haptic waveform should commence, and/or
   b. A haptic sync marker may be added to the haptic stream to indicate the start of the haptic waveform to be output.
3. In a preferred aspect, the haptic sync marker for the haptic waveform will be received first, so that the haptic waveform is buffered on the haptic amplifier. Haptic playback can then commence when the corresponding audio sync marker is detected in the audio stream.
4. In the case that the audio sync marker is first detected on the audio stream then at least one of the following may be performed:
   a. The haptic output can be played as soon as it is detected (i.e. the haptic event may be delayed relative to the audio), or
   b. The audio playback rate can be adjusted to ensure synchronization.

Further details of any such synchronisation system may be found in U.S. patent application Ser. No. 15/875,512, the contents of which are incorporated by reference herein.

The audio output transducer may comprise a speaker. The haptic output transducer can be considered to be a device that generates a vibration in response to a received haptic signal. The actuator may be, for example, an Eccentric Rotating Mass (ERM) actuator, a Linear Resonant Actuator (LRA), or a piezoelectric actuator.

According to the present example the input signal x received by the drive circuit comprises a mixed signal comprising i) an audio signal representing audio to be output by the audio output transducer and ii) a haptic signal representing a haptic output to be output by a haptic output transducer. The mixed input signal is preferably received via a channel for carrying audio data. Thus, the channel may be an audio channel. The audio channel may be considered to comprise a data signal which is primarily used for the transmission of audio data. According to one or more examples a system may be provided with a single audio channel, e.g. for monaural audio systems, or with multiple audio channels, e.g. separate left and right channels for stereo audio systems. It will be understood that the signal path 300 may be configured to transmit a plurality of different audio channels.

According to the present example audio data and haptic data is sent on the same channel from the signal processor to the driver circuit. Thus, since existing operating systems already support an audio signal interface between the signal processor and the audio amplifier, there is no need to provide an additional signal interface for the transmission of haptic information.

According to one or more of the present examples the transmission of haptic information from the signal processor to the haptic amplifier is achieved by encoding the haptic information into a designated portion of the same channel that is used to carry audio data. It will be appreciated that there are various ways in which the haptic information may be encoded or modulated onto the channel. According to one example, the haptic information is frequency modulated onto a predetermined frequency carrier (e.g. 21 kHz) or band of frequency carriers.

Figure 3A:
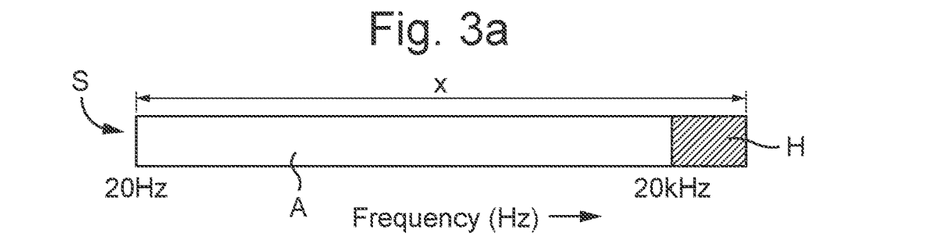
FIGS. 3a, 3b and 3c illustrate examples of channel modulation schemes for carrying a mixed input signal.
Figure 3B:
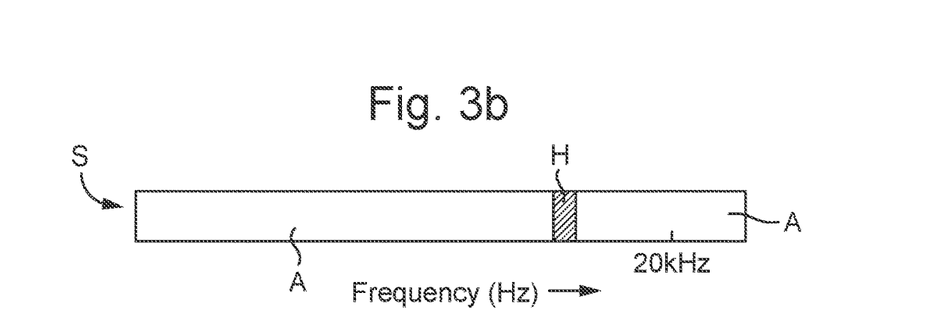
Figure 3C:
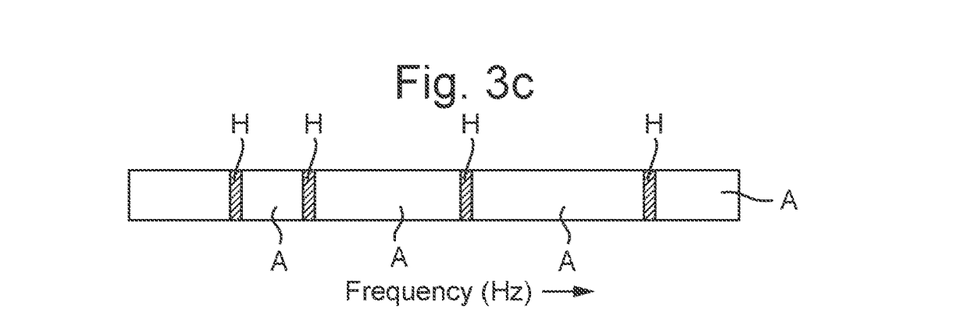

FIGS. 3a, 3b and 3c illustrate examples of channel modulation schemes for carrying a mixed input signal.

FIG. 3a illustrates an example of a channel S, for example an audio channel, carrying a mixed input signal x. In this particular example the audio channel comprises a frequency band of 20 Hz to 24 kHz. The mixed input signal x comprises an audio signal and a haptic signal. The audio signal comprises audio information and the haptic signal comprises haptic information. As illustrated in FIG. 3a the haptic signal is carried by, or encoded onto, a designated portion H of the audio channel. The designated portion H of the channel comprises a single discrete carrier frequency or band of carrier frequencies of the channel. In this particular example the discrete portion of the channel comprises one or more carrier frequencies in the frequency band between 20 kHz and 24 kHz.

It will be appreciated that humans can hear a frequency range of between 20 Hz and around 20 kHz. Moreover, a speaker will typically have an effective upper frequency limit of 20 kHz. Thus, according to the present example wherein the frequency range of the audio channel extends above 20 kHz, it is advantageous to utilise the upper part of the channel—in particular the portion above 20 kHz—to carry haptic information.

According to one or more examples it will be understood that the upper portion of the channel may be considered to comprise frequencies above a given frequency threshold or boundary. For example, an upper portion of the channel may be defined as comprising frequencies above, e.g. 16 kHz.

FIG. 3b illustrates an example of an audio channel S carrying a mixed input signal x. In this example the portion H of the channel designated to carry haptic information comprises one or more carrier frequencies in a frequency band that is between 20 Hz and 20 kHz.

FIG. 3c illustrates a further example of an audio channel S carrying a mixed input signal x. In this example the haptics signal is spread across a plurality of different frequency bands of the audio channel. It will be understood by the skilled person that this may be achieved using known spread spectrum coding techniques.

It will be appreciated that one or more of the present examples may be applicable to the case of a stereo audio system comprising first and second audio transducers (speakers). For example a system for providing audio and haptic outputs may comprise a device, such as a mobile phone or gaming device, for running an application and providing a user interface. The device may be connected to a stereo headset comprising a pair of speakers. Thus, according to one or more examples, the system may comprise multiple audio channels.

Thus, first and second input signals may be received by the drive circuit via a first and second stereo channel respectively. According to at least one example, each input signal comprises both audio content and haptic content. According to one example the haptic information may be divided between the first and second stereo channels. For example, the haptic information may comprise both the magnitude of the vibration and the direction of the vibration (e.g. the intended vibration may be in the same plane as the screen or may be orthogonal to the screen). Thus, it is envisaged that the magnitude of the vibration may be encoded into the first stereo channel whilst the direction of the vibration may be encoded into the second stereo channel. Alternatively, the magnitude and direction of the haptic waveform may be encoded onto a single stereo channel leaving the other stereo channel free for other potential uses. For example, haptic data may be transmitted using a first stereo channel along with audio data for that channel, while the second stereo channel may be used for the transmission of application-related metadata along with audio data for the second channel. In a further example, a first stereo channel may be used for the block transmission of haptic waveforms or atoms for the construction of haptic waveform libraries within the haptics amplifier, to be triggered from specific events or cues within an application, wherein the second stereo channel may be provided with haptics data which can define magnitude, direction, etc. of the selected waveform from the library.

According to at least one example, the haptics amplifier is configured to receive a mixed input signal, wherein the mixed input signal represents both audio data and haptic data. Thus, the haptics amplifier is configured to extract the haptic data or information from the input signal by a process of decoding. Thus, the haptics amplifier is configured to extract and generate the haptic waveform from a designated portion of the input signal, wherein the location of the designated portion will typically be pre-known at the amplifier or may be signalled. The content of the designated portion of the input portion is extracted by decoding the signal to a baseband signal, wherein the baseband signal may be output as a drive signal to the haptics transducer. The step of decoding may comprise demodulation such as an FM demodulation of the designated portion of the input signal.

Figure 5:
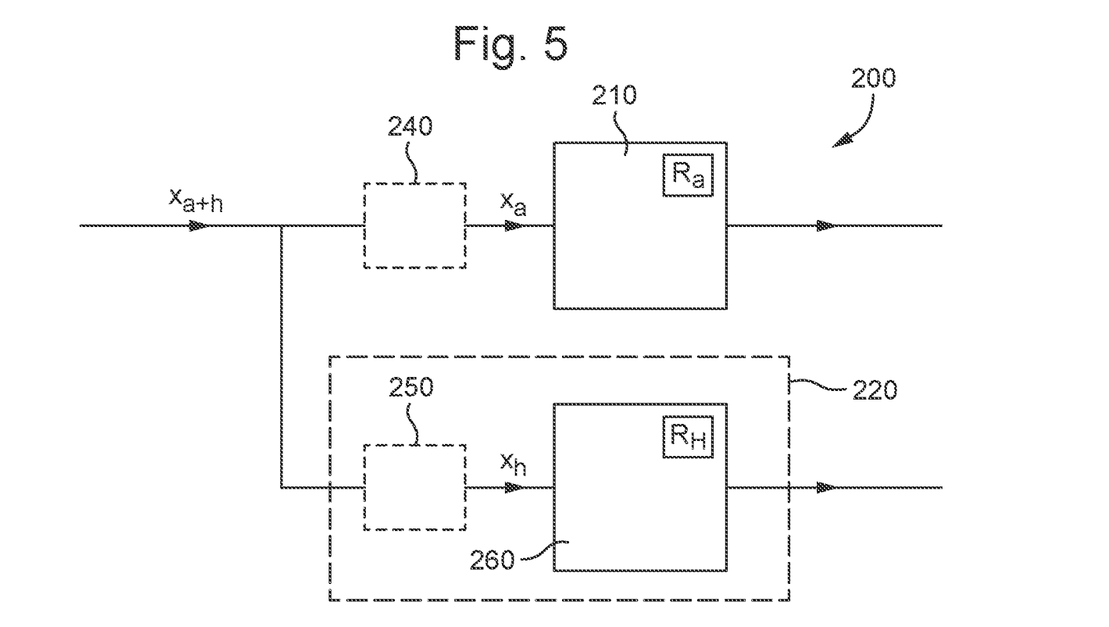
FIG. 5 is a block diagram of a drive circuit according to a further example.

According to one or more examples, and as illustrated in FIG. 5, the mixed input signal $x_{a+h}$ may be filtered in order to remove the audio data or the haptic data. For example, the drive circuit 200 may comprise a first filter 240 which is provided prior to the audio amplifier 210 and is configured to remove haptic data contained in the input signal. Thus, the haptic data filter outputs a signal $x_a$ that represents just audio data which is sent to the audio amplifier. In this example the audio amplifier recovers the audio data although it will be appreciated that the recovery or decoding of audio data may take place in a portion which provides the first filter 240 or in a portion provided between the filter and the audio amplifier. Additionally or alternatively, the drive circuit may comprise a second filter 250, which is provided prior to a haptic amplifier portion 260 and is configured to remove audio data contained in the input signal. Thus, the second filter 250 is configured to generate a signal $x_h$ that represents just the haptics information, which is sent to the haptic amplifier portion. As illustrated in FIG. 5, the haptics filter 250 is implemented within a haptic amplifier module 220. However, it is envisaged that the haptics filter may be implemented as a separate module provided in advance of the haptic amplifier module. The first and/or second filter may comprise a low-pass filter or a brick-wall filter which is configured to filter one or more frequencies or frequency bands of the channel.

According to one or more examples, the signal processor is configured to derive a mixed signal comprising i) an audio signal representing audio to be output by the audio output transducer and ii) a haptic signal representing a haptic output to be output by a haptic output transducer. There are a number of ways in which the mixed signal may be derived. For example, the mixed signal may be pre-mixed into pre-recorded audio waveforms by the manager or programmer of the application and then stored in a memory of the signal processor. Alternatively, the haptic information/waveforms may be mixed in real time with gaming audio. According to one or more examples the process of deriving the mixed signal comprises filtering (e.g. brick wall filtering) the audio content at one or more frequencies in order to keep the carrier frequencies of the transmission channel available for haptic content. For example, the audio signal may be filtered to remove audio data from a designated portion, e.g. an upper portion of the channel. This can be considered to "clear the way" for haptics data to be encoded into the filtered portion. This beneficially ensures that the encoding of haptics data can take place without interference from pre-existing audio.

The mixed input signal is sent from the signal processor 108 to the drive circuit 200 via a channel, such as a channel for carrying audio data. The channel may be implemented by an electrical serial bus interface such as $I^2S$ or SPI.

Thus, according to at least one example of a system for providing haptic and audio events, the haptic information is encoded at the signal processor side onto a designated portion of a channel which forms an interface between the signal processor and the drive circuit (comprising a haptic and an audio amplifier). The haptic amplifier is configured to receive an input signal and to decode or demodulate the haptic information from the designated portion of the received input signal. In cases where the designated portion of the audio channel is spread across multiple frequencies or frequency bands of the audio channel, the haptic amplifier is configured to spread spectrum decode the input signal in order to derive the haptic information.

In a further aspect, for a system wherein the audio signal is provided as a digital signal across a plurality of digital bits, the haptic information may be encoded in a portion of the bits of the digital signal, for example in the least significant bits of the digital signal.

For example, in systems using I2S communication, many systems use 24-bit encoding, however the audio signal may only require a sub-portion of the total bit width available, e.g. an audio signal may be only 16 bits resolution, while the haptic signal requires low dynamic range. In systems where the digital representation of the signal is not altered (e.g. a lossless connection from the AP), then the lowest bits of the digital signal could be used to store the haptic signal.

The equivalent to filtering in the audio amplifier would therefore be to simply disregard the lowest or least significant X bits of the data channel. The equivalent to filtering in the haptic amplifier would therefore be to simply disregard the highest or most significant Y bits of the data channel. (Where X+Y the total bits available in the data channel.)

Since the haptic signal has low bandwidth, the data for each haptic sample could be spread across more than one audio samples, so that the number of bits used to encode the haptic signal per audio sample is minimized, i.e., since the effect bandwidth of haptic signal is <1 kHz the lowest significant bit would be sufficient.

The advantage of this approach is that it is computationally simpler at both the AP and the haptic/audio amplifier, relative to other schemes such as frequency modulation.

Figure 4:
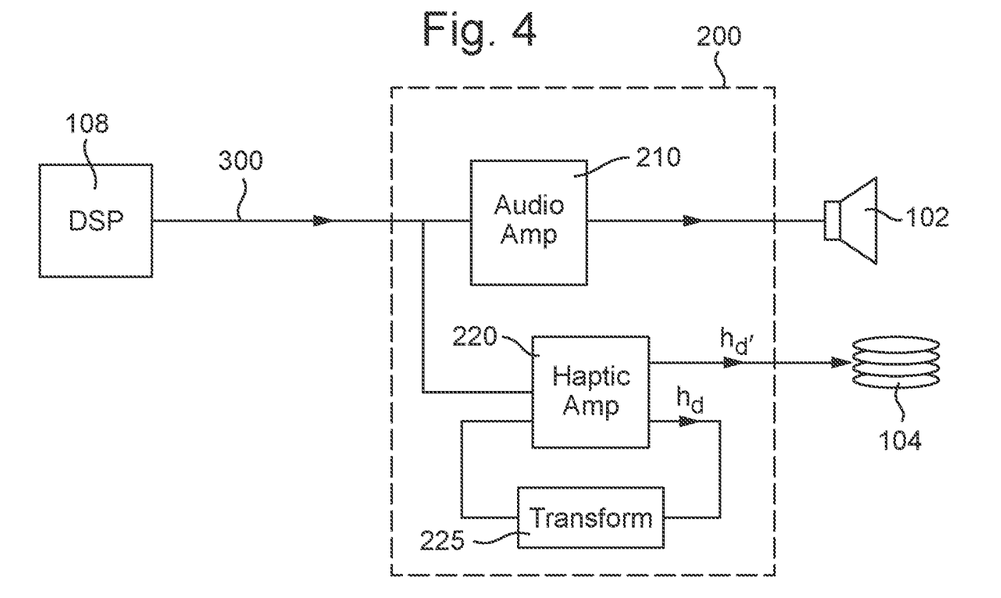
FIG. 4 is a block diagram of a system architecture for providing audio and haptic outputs according to a present example.

FIG. 4 is a block diagram of a system architecture of a system for providing audio and haptic outputs according to a present example. The system is similar to the system shown in FIG. 2 and comprises a drive circuit 200 according to a second example of the first aspect.

The drive circuit 200 receives an input signal x via the signal path 300. The input signal x is fed to an audio amplifier 210. The audio amplifier 210 is configured to derive audio data from the input signal and to generate an audio drive signal $a_d$. The audio drive signal is output to the audio output transducer 102 in order to cause the audio output transducer to generate an audio effect. The input signal x is also fed to a haptics amplifier 220. The haptics amplifier 220 is configured to derive haptic information from the input signal x. The drive circuit further comprises a transformation unit 225 having a transfer function which is derived from one or more characterisation parameters. The characterisation parameters may be derived from device-specific data, such as data relating to the mounting position of the haptic actuator and/or the characteristics of the haptic actuator and/or the characteristics of the host device. The haptic waveform $h_d$ derived by the haptics amplifier is passed through the transformation unit which transforms or modifies the waveform according to a transfer function of the transformation unit in order to produce a device specific waveform $h_{d'}$. The device specific waveform $h_{d'}$ forms the drive signal of the haptic actuator 104.

It will be appreciated that each haptic actuator can have different haptic characteristics and, further, that the characteristics of the vibration may depend on the mounting position and on the characteristics of the device itself. The provision of a transformation unit 225 beneficially allows the characteristics of the device and of the haptic actuator to be taken into account when deriving the final haptic drive signal. Furthermore, it will be appreciated that the haptic amplifier may be provided with a protection circuit or algorithm which is operable to mitigate over heat or mechanical damage to the actuator. The transformation unit may be configured to modify the haptic content that is derived from the input signal for conformity with the protection circuit and/or such that any physical thresholds e.g. temperature and excursion—are not exceeded.

According to one or more examples the haptics amplifier may be configured to monitor one or more of the voltage, current, position or any other suitable status indicator of the haptics actuator, and to take such monitored data into account when deriving the final haptic drive signal, to ensure that the haptic drive signal can be dynamically tailored for operation of the actuator.

Thus, according to one or more of the present examples, the haptic content may be generated or selected at the signal processor without any knowledge of the implementation characteristics of the intended haptic event at the signal processor side, whilst still enabling the implementation characteristics to be reflected in the haptic drive signal.

It will be understood that the haptics data to be encoded into the audio channel may be provided in a generic format, which is not specific to any particular haptic transducer. For example, according to one or more examples the haptics data may be provided as a measure of the force level required for the haptic output, e.g. defining the desired force level for the haptics output, such as a level of micro-G of force required or defining the likely acceleration. This beneficially allows a system for providing haptic and audio output to be designed in from the start, and utilised for any application such as gaming software which is desired to be used across a wide variety of output devices. Accordingly, the appropriate transformation or compensation of the generic haptics data can be performed by the haptics amplifier provided in the specific device, having detailed knowledge of the type and configuration of haptics actuator used in the device itself.

According to the present examples the haptic information defines at least one haptic effect to be output by the haptic actuator. For example, the haptic information may define a pulse signal or waveform. The haptic drive signal is output to the haptic output transducer (actuator) in order to drive the haptic output transducer and thus generate a haptic effect.

According to at least one example, the audio output transducer may comprise a speaker. The speaker may be implemented in a device such as a mobile phone or may form part of a stereo audio system and provided in an earbud or headphone set.

While the invention is described above as having a signal path 300 in the form of an electrical serial bus interface such as I²S or SPI, it will be understood that alternative bus systems may also be used, e.g. Slimbus® or Soundwire®. In addition, it will be understood that at least a portion of the signal path 300 may be provided as a wireless data link, e.g. using BlueTooth® or any other suitable wireless data protocol.

It will be appreciated that various elements, units, modules or circuits of a system for providing audio and haptic output according to a present example may be implemented in a single device or may be implemented by a plurality of separate devices. Thus, it will be appreciated that any data link for transferring data between elements (which may be considered to be e.g. the signal processor, the haptic/audio amplifier and the haptic/audio output transducer) of a given example may be provided by a wired or a wireless data link. For example, according to one particular example, a signal processor (which may be associated with a gaming engine) is provided in a separate device to a drive circuit or drive engine comprising an audio output amplifier and a haptic output amplifier. Thus, the input of the drive circuit may comprise a wireless input for receiving data via a wireless data link from the signal processor. It is also envisaged that the audio and/or haptic output transducer may be provided in a separate device to the drive circuit for deriving audio/haptic information and for generating a respective audio/haptic drive signal. Thus, the audio/haptic drive signal(s) may be sent from the drive circuit or module to the respective output transducer via a wired or wireless data connection.

It will be understood that the audio channel referred to in the above description may be provided as an analog data channel or as a digital data channel. In the case of an analog data channel, information such as transmitted voltage, current or frequency etc. may be modulated onto a carrier signal. In the case of a digital data channel, the transmitted data represents an analog signal, some components of which may be a signal with a carrier frequency or span a particular frequency band which transmits the relevant information.

The skilled person will recognise that some aspects or features of the above-described examples may be embodied as processor control code, for example on a non-volatile carrier medium such as a disk, CD- or DVD-ROM, programmed memory such as read-only memory (Firmware), or on a data carrier such as an optical or electrical signal carrier. Some aspects or features may be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the examples may also be implemented using code running on a field-(re)programmable analogue array or similar device in order to configure analogue hardware.

Note that as used herein the term unit, or module shall be used to refer to a functional unit or block which may be implemented at least partly by dedicated hardware components such as custom defined circuitry and/or at least partly be implemented by one or more software processors or appropriate code running on a suitable general purpose processor or the like. A unit may itself comprise other units, modules or functional units. A unit may be provided by multiple components or sub-units which need not be co-located and could be provided on different integrated circuits and/or running on different processors.

Examples may be implemented in a host device, especially a portable and/or battery powered host device such as a mobile computing device, for example, a laptop or tablet computer, a games console, a remote control device, a home automation controller or a domestic appliance including a smart home device, a domestic temperature or lighting control system, a toy, a machine such as a robot, an audio player, a video player, or a mobile telephone, for example, a smartphone.

Many electronic devices include acoustic output transducers, i.e. transducers for converting a suitable electrical driving signal into an acoustic output such as a sonic pressure wave or mechanical vibration. For instance many electronic devices may include one or more loudspeakers for sound generation, e.g. for playback of audio content and/or voice communications and/or providing audible notifications. Such loudspeakers may comprise an electromagnetic actuator, for example a voice coil motor which is mechanically coupled to a flexible diaphragm, for example a conventional loudspeaker cone, or which is mechanically coupled to a surface of a device, for example the glass screen of a cell phone. Some electronic devices may also include acoustic output transducers capable of generating ultrasonic waves, e.g. for proximity detection type applications and/or machine-to-machine communication. Many electronic devices may additionally or alternatively include more specialised acoustic output transducers, i.e. haptic transducers, tailored for generating vibrations, e.g. for haptic control feedback or notifications to a user. Additionally or alternatively an electronic device may have a connector, e.g. a socket, for making a removable mating connection with a corresponding connector of an accessory apparatus and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic transducers the driving signal will generally be an analogue time varying voltage signal, i.e. some time varying waveform.

It should be noted that the above-mentioned examples illustrate rather than limit the invention, and that those skilled in the art will be able to design many alternative examples without departing from the scope of the appended claims. The word "comprising" does not exclude the presence of elements or steps other than those listed in a claim, "a" or "an" does not exclude a plurality, and a single feature or other unit may fulfill the functions of several units recited in the claims. Any reference numerals or labels in the claims shall not be construed so as to limit their scope.

The invention claimed is:

1. An audio-haptic system comprising:
    a signal processor;
    a drive circuit;
    an audio output transducer; and
    a haptic output transducer,
    wherein:
        the signal processor is configured to provide an input signal for the drive circuit, the input signal representing audio information and haptic information;
        the drive circuit comprises an audio output amplifier configured to generate an audio drive signal for driving the audio output transducer based on the audio information represented in the input signal and a separate haptic output amplifier configured to generate a haptic drive signal for driving the haptic output transducer based on the haptic information represented in the input signal and is implemented on a single ASIC chip;
        the drive circuit comprises a synchronisation module, the synchronisation module arranged to synchronise output of the audio drive signal and the haptic drive signal;
        the synchronisation module is provided in the audio output amplifier, the haptic output amplifier, or both; and
        the synchronisation module is configured to monitor steps of decoding or recovering the audio information, the haptic information, or both to account for any variation in recovery and output paths to the audio output transducer and the haptic output transducer based on an embedded synchronisation marker in the audio information, the haptic information, or both and based thereon to synchronise the output of the audio drive signal and the haptic drive signal.

2. The audio-haptic system as claimed in claim 1, wherein the signal processor is provided in a separate device from the drive circuit.

3. The audio-haptic system as claimed in claim 1, wherein the drive circuit comprises:
    an audio recovery portion for recovering the audio information from the input signal; and
    a haptic recovery portion for recovering the haptic information from the input signal.

4. The audio-haptic system as claimed in claim 3, wherein the audio output amplifier comprises the audio recovery portion and the haptic output amplifier comprises the haptic recovery portion.

5. The audio-haptic system as claimed in claim 3, wherein the haptic recovery portion is configured to derive the haptic information from a designated portion of the input signal.

6. The audio-haptic system as claimed in claim 5, wherein the drive circuit is configured to receive a signal signalling a location of the designated portion of the input signal.

7. The audio-haptic system as claimed in claim 1, wherein the input signal is carried from the signal processor to the drive circuit by a single channel.

8. The audio-haptic system as claimed in claim 7, wherein the channel is an audio channel.

9. The audio-haptic system as claimed in claim 1, wherein:
    the signal processor comprises a digital signal processor; or
    the drive circuit is a drive module, drive unit or drive engine; or
    the audio output transducer comprises a speaker; or
    the haptic output transducer comprises a haptic actuator.

10. A drive circuit for use in an audio-haptic system, the system comprising a signal processor, an audio output transducer and a haptic output transducer, wherein the signal processor is configured to provide an input signal for the drive circuit, the input signal representing audio information and haptic information, and wherein the drive circuit comprises an audio output amplifier configured to generate an audio drive signal for driving the audio output transducer based on the audio information represented in the input signal and a separate haptic output amplifier configured to generate a haptic drive signal for driving the haptic output transducer based on the haptic information represented in the input signal and is implemented on a single ASIC chip, wherein:
    the drive circuit comprises a synchronisation module, the synchronisation module arranged to synchronise output of the audio drive signal and the haptic drive signal;
    the synchronisation module is provided in the audio output amplifier, the haptic output amplifier, or both; and
    the synchronisation module is configured to monitor steps of decoding or recovering the audio information, the haptic information, or both to account for any variation in recovery and output paths to the audio output transducer and the haptic output transducer based on an embedded synchronisation marker in the audio information, the haptic information, or both and based thereon to synchronise the output of the audio drive signal and the haptic drive signal.

11. A single ASIC chip for use in an audio-haptic system, the system comprising a signal processor, a drive circuit, an audio output transducer and a haptic output transducer, wherein the signal processor is configured to provide an input signal for the drive circuit, the input signal representing audio information and haptic information, and wherein the single ASIC chip comprises the drive circuit, the drive circuit comprising an audio output amplifier configured to generate an audio drive signal for driving the audio output transducer based on the audio information represented in the input signal and a separate haptic output amplifier configured to generate a haptic drive signal for driving the haptic output transducer based on the haptic information represented in the input signal; wherein:
    the drive circuit comprises a synchronisation module, the synchronisation module arranged to synchronise output of the audio drive signal and the haptic drive signal;
    the synchronisation module is provided in the audio output amplifier, the haptic output amplifier, or both; and
    the synchronisation module is configured to monitor steps of decoding or recovering the audio information, the haptic information, or both to account for any variation in recovery and output paths to the audio output transducer and the haptic output transducer based on an embedded synchronisation marker in the audio information, the haptic information, or both and based thereon to synchronise the output of the audio drive signal and the haptic drive signal.

* * * * *